United States Patent
Awasthi et al.

(10) Patent No.: US 7,480,823 B2
(45) Date of Patent: Jan. 20, 2009

(54) IN-MEMORY REPLICATION OF TIMING LOGIC FOR USE IN FAILOVER WITHIN APPLICATION SERVER NODE CLUSTERS

(75) Inventors: Vikas Awasthi, Kanpur (IN); Servesh Singh, Bangalore (IN)

(73) Assignee: Sun Microsystems, Inc., Santa Clara, CA (US)

(*) Notice: Subject to any disclaimer, the term of this patent is extended or adjusted under 35 U.S.C. 154(b) by 511 days.

(21) Appl. No.: 11/212,303

(22) Filed: Aug. 24, 2005

(65) Prior Publication Data

US 2006/0294417 A1 Dec. 28, 2006

(30) Foreign Application Priority Data

Jun. 24, 2005 (IN) .......................... 557/KOL/2005

(51) Int. Cl.
*G06F 11/00* (2006.01)
(52) U.S. Cl. .................................. 714/15; 714/4; 714/6
(58) Field of Classification Search ...................... 714/4, 714/6, 15
See application file for complete search history.

(56) References Cited

U.S. PATENT DOCUMENTS

| | | | | |
|---|---|---|---|---|
| 6,134,673 A * | 10/2000 | Chrabaszcz | ................ | 714/13 |
| 6,421,739 B1 * | 7/2002 | Holiday | ................ | 719/330 |
| 6,571,274 B1 * | 5/2003 | Jacobs et al. | ................ | 709/203 |
| 6,581,088 B1 * | 6/2003 | Jacobs et al. | ................ | 718/105 |
| 6,807,547 B2 * | 10/2004 | Matena et al. | ................ | 707/103 R |
| 6,877,111 B2 * | 4/2005 | Sharma et al. | ................ | 714/13 |
| 6,944,788 B2 * | 9/2005 | Dinker et al. | ................ | 714/4 |
| 7,085,852 B2 * | 8/2006 | Kumar et al. | ................ | 709/248 |
| 7,240,058 B2 * | 7/2007 | Kumar et al. | ................ | 707/10 |
| 7,320,088 B1 * | 1/2008 | Gawali et al. | ................ | 714/6 |
| 2003/0177411 A1 * | 9/2003 | Dinker et al. | ................ | 714/13 |
| 2004/0158549 A1 * | 8/2004 | Matena et al. | ................ | 707/1 |
| 2005/0273674 A1 * | 12/2005 | Shinn et al. | ................ | 714/55 |
| 2007/0288481 A1 * | 12/2007 | Shinn et al. | ................ | 707/10 |

OTHER PUBLICATIONS

Abraham Kang, "J2EE clustering, Part 1, Clustering technology is crucial to good Website design; do you know the basics?" Printed from http://www.javaworld.com/javaworld/jw-02-2001/jw-0223-extremescale_p.html, pp. 1-14.

Abraham Kang, "J2EE clustering, Part 2, Migrate your application from a single machine to a cluster, the easy way," printed from http://www.javaworld.com/javaworld/jw-08-2001/jw-0803-extremescale2_p.html, pp. 1-10.

* cited by examiner

*Primary Examiner*—Joshua A Lohn
(74) *Attorney, Agent, or Firm*—Dorsey & Whitney LLP

(57) ABSTRACT

A system to execute an application comprises a cluster of a plurality of application server nodes. A particular one or more of the application server nodes has residing thereon at least one container that contains business logic for the application. The particular one or more of the application server nodes is configured to maintain self-timing information for use to schedule execution of the business logic contained by the at least one container residing on the particular one or more application server nodes. Also, at least one of the other application server nodes is configured to maintain backup timing information for the particular one or more of the application server nodes, from which the self-timing information maintained by the particular one or more of the application server nodes can be derived.

14 Claims, 4 Drawing Sheets

IN-MEMORY REPLICATION OF TIMING LOGIC FOR USE IN FAILOVER WITHIN APPLICATION SERVER NODE CLUSTERS

TECHNICAL FIELD

The present invention is in the field of failover of timing logic for use by business logic in objects residing on application server nodes of a cluster of application server nodes and, in particular, relates to such failover of timing logic in a highly-available manner.

BACKGROUND

ENTERPRISE JAVABEANS (EJB) technology is a well-known server-side component architecture for the JAVA 2 Platform, Enterprise Edition (J2EE) platform. EJB technology enables rapid and simplified development of distributed, transactional, secure and portable applications based on JAVA technology.

An EJB is an object that contains business logic for an application. An EJB container manages one or more EJB's contained within it. For example, for each EJB, the EJB container containing that EJB may register the EJB object, provide a remote interface for the EJB object, create and destroy EJB object instances, check security for the EJB object, manage the active state for the EJB object, and coordinate distributed transactions with the EJB object. The EJB container can also manage all persistent data within the EJB object.

An application server is a server program in a computer, within a distributed network, on which the business logic of an application executes. A cluster of interoperable application server nodes (within J2EE, for example) can provide an infrastructure (typically, transparent) for executing an application, with properties of high availability and scalability.

For example, FIG. 1 illustrates an example of a conventional architecture including a cluster 102 of application server nodes $104_{N1}$, $104_{N2}$, $104_{N3}$ and $104_{N4}$. In the FIG. 1 example, a load balancer 106 provides the capability to associate a client request (via the firewall 108) with an object in a particular application server node (generically, 104) of the cluster 102. Reference numeral 110 denotes the Internet or other sources (typically, "untrusted") of client requests. The cluster 102 of application server nodes 104 may, for example, operate to collectively provide services such as connections to shared resources 112 (which may be, as just some examples, a file system, a database or an enterprise messaging product such as a JMS application).

Each application server node may maintain timing information to be used by business logic of containers residing on that application server node. As an example, particular business logic may be scheduled, using the timing information, to occur at regular intervals. For example, each timer may have a "time" associated with it. The time may, for example, represent an absolute time, such as a callback time of 6:00 PM daily. As another example, the time may represent an interval, such as might be used to cause a callback every 5 minutes when a particular business method is invoked for the first time. Some of the timing information may be start time, next expiry time and whether the timer is a one-time timer or an interval timer (i.e., that exists until closed by a user). Conventionally, when timing information is created by an application server node of a cluster, the timing information is made persistent in secondary storage, such as in the shared resources 112.

We now discuss high availability and failover, and the relationship of these concepts to timing information. High availability refers to the availability of resources in a computer system, even where components in the computer system have failed. In some examples of application server node and cluster configurations, the property of high availability is accomplished using a load balancing algorithm that provides for response to requests for a service as long as the system is generally operational. Typically, in normal operation, a high availability algorithm (executed by the load balancer 106, for example) forwards particular requests to corresponding preferred ones of the application server nodes 104.

When/if the preferred application server node 104 becomes unavailable, a "cluster service" notifies the components of the system (e.g., the other application server nodes) of the failure. In general, a "cluster service" is a software component that controls all aspects of server cluster operation and manages the cluster database. The high availability algorithm operates to redirect the particular requests to another one of the application server nodes 104 of the cluster 102 that is still operational. As part of the redirection of particular requests, other application server nodes 104 are configured to be able to service the particular requests previously forwarded to the now-unavailable application server node.

More generally than "high availability," "failover" refers to the ability to perform redirection of requests with minimal disruption of service. Since timers are generally invoked in a transaction and security context, this adds complexity to considerations of failover and high availability. Handling timer expiry is a primary complexity in timer clustering. During failover, the timing information maintained by a now-unavailable application server node is made available to the other application server node, to which the requests previously forwarded to the now-unavailable server node are redirected.

In particular, typically, the timer information is persisted (i.e., stored in a way that timer information for an application server node can be recovered if the application server node fails) in a database or database cluster serving a cluster of application server nodes. During failover, the timing information is recovered by the other application server node from the database or database cluster. In this way, the business logic of other application server nodes can use the timing information if called upon to handle requests that were previously forwarded to a non-unavailable application server node.

SUMMARY

Improved failover of timing information is provided. Furthermore, provision for failover of the timing information in handled more efficiently.

A system to execute an application comprises a cluster of a plurality of application server nodes. A particular one or more of the application server nodes has residing thereon at least one container that contains business logic for the application. The particular one or more of the application server nodes is configured to maintain self-timing information for use to schedule execution of the business logic contained by the at least one container residing on the particular one or more application server nodes. Also, at least one of the other application server nodes is configured to maintain backup timing information for the particular one or more of the application server nodes, from which the self-timing information maintained by the particular one or more of the application server nodes can be derived.

DETAILED DESCRIPTION

Figure 1:
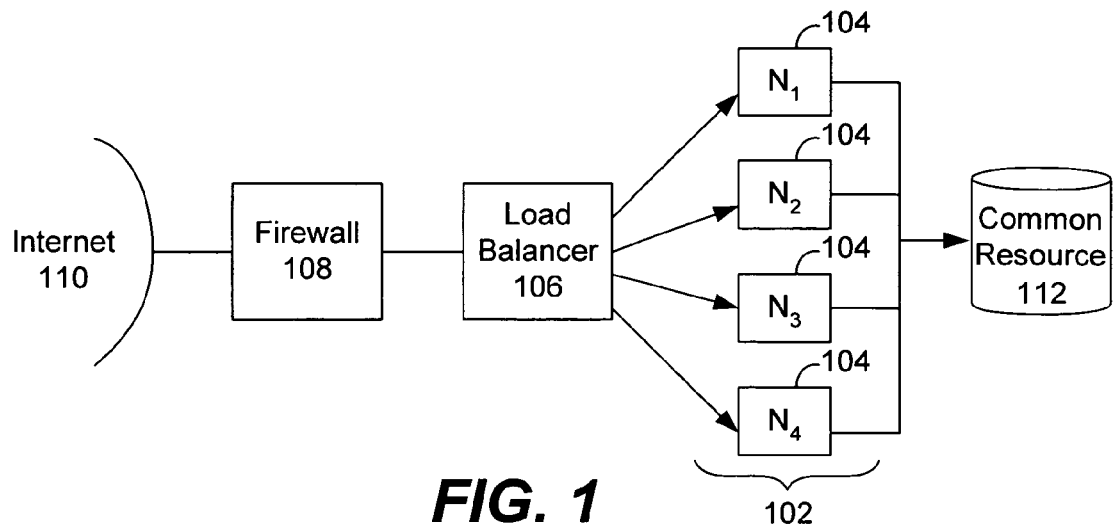
FIG. 1 illustrates a conventional architecture including a cluster of application servers.

Referring back to the conventional architecture described with reference to FIG. 1, while the timing information in the shared resources 112 are highly available, it is desirable to minimize the failover time involved with the timing information. Furthermore, it is desirable to minimize the overhead associated with maintaining timing information persistence.

In accordance with aspects of the invention, timing information for the application server nodes of a cluster of interoperable application server nodes are maintained locally to the application server nodes. More specifically, the timing information used by each application server node of a cluster is maintained locally to that application server node. Furthermore, the timing information used by each application server node of a cluster is also maintained, as timer information objects, in at least one other application server node.

A timer information object is an object (e.g., a serializable object) that contains at least enough information about a timer (e.g., an EJB timer) to create a new timer with substantially the same properties, typically in another application server node. Maintaining a timer information object locally to an application server node may include, for example, maintaining the timer information object in a memory associated with, and highly accessible to, that application server node.

Figure 2:
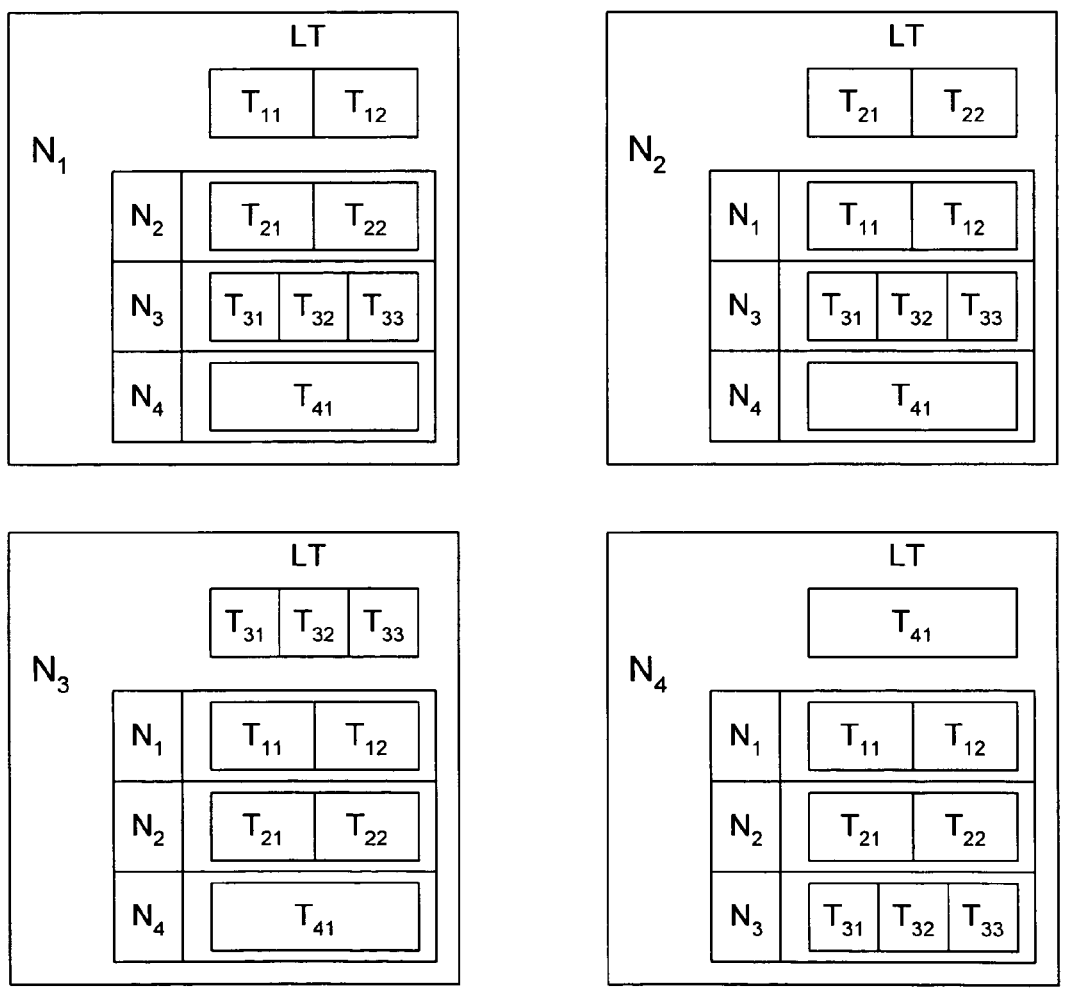
FIG. 2 schematically illustrates an example of timing information being maintained by application server nodes of a cluster of application server nodes.

FIG. 2 schematically illustrates an example of timing information being maintained by application server nodes $N_1$, $N_2$, $N_3$ and $N_4$ of a cluster 200 of application server nodes. In FIG. 2, "LT" for a particular application server node indicates the local timing information used specifically by business logic processed by that application server node. $N_i$ indicates that "$i^{th}$" application server node of a cluster. Finally, $T_{ij}$ indicates the $j^{th}$ local timing information of the $i^{th}$ application server node.

Thus, for example, application server node $N_1$ maintains local timing information $T_{11}$ and $T_{12}$. In addition, application server node $N_1$ maintains a "remote map" of timer information objects for the timing information of application server nodes $N_2$, $N_3$ and $N_4$. For example, application server node $N_1$ maintains a remote map of redundant timing information $T_{21}$ and $T_{22}$ for application server node $N_2$; maintains a remote map of redundant timing information $T_{31}$, $T_{32}$ and $T_{33}$ for application server node $N_3$ and maintains a remote map of redundant timer $T_{41}$ for application server node $N_4$. Similarly application server node $N_2$ maintains a remote map of redundant timing information for application server nodes $N_1$, $N_3$ and $N_4$; application server node $N_3$ maintains a remote map of redundant timing information for application server nodes $N_1$, $N_2$ and $N_4$; and application server node $N_4$ maintains a remote map of redundant timing information for application server nodes $N_1$, $N_2$ and $N_3$.

Figure 3:
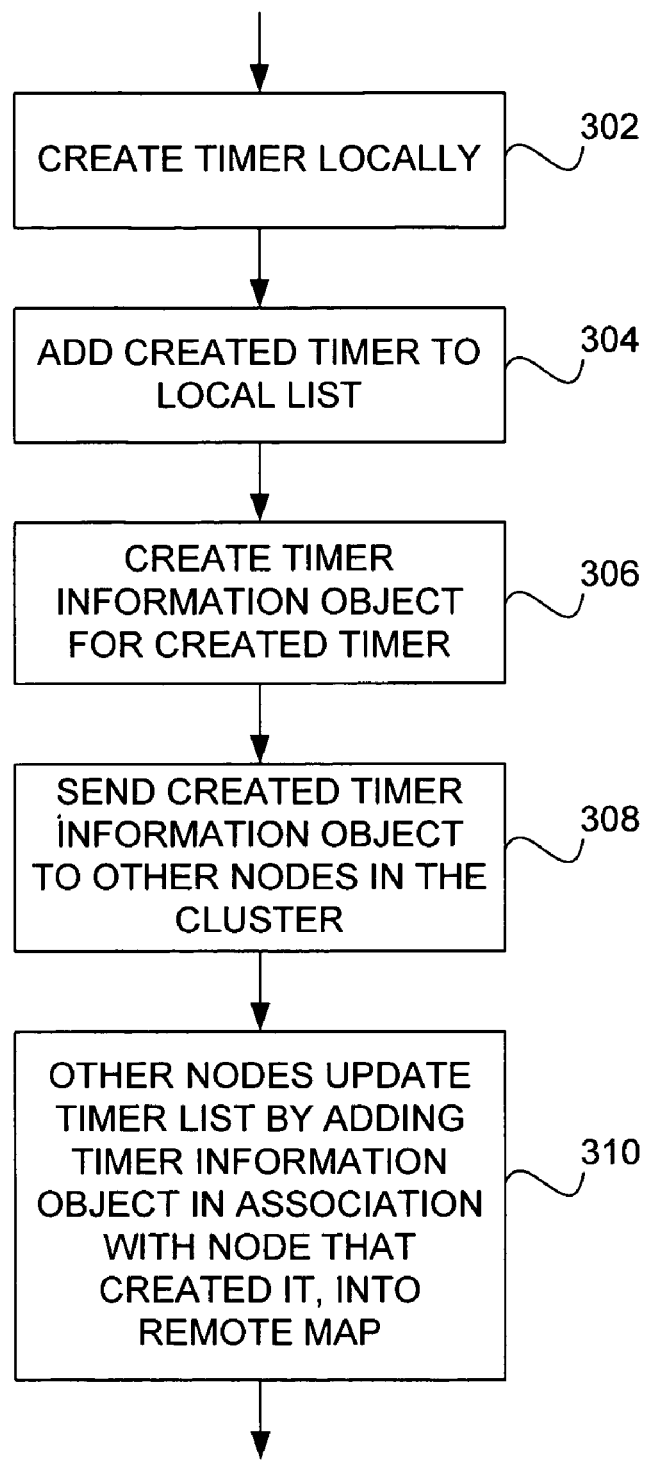
FIG. 3 is a flowchart illustrating a method by which a timer is created and maintained among a cluster of application server nodes.

FIG. 3 is a flowchart illustrating a method by which timing information is created and maintained among a cluster of application server nodes. At step 302, an application server node creates timing information locally. At step 304, the application server node adds the created timing information to a local list. For example, referring to FIG. 2, the locally-created timing information may be $T_{11}$, created by application server node $N_1$ and in the LT list for application server node $N_1$.

At step 306, a timer information object is created for the locally-created timing information, by the application server node. Using the present example, the application server node $N_1$, which created the timing information $T_{11}$ locally, would also create the timer information object for the locally-created timing information $T_{11}$. At step 308, the created timer information object is sent to the other application server nodes in the cluster. For example, the application server node $N_1$ may send the created timer information object for $T_{11}$ to the application server nodes $N_2$, $N_3$ and $N_4$.

At step 310, the other application server nodes in the cluster update their respective remote map timing information lists by adding the timer information object in association with the application server node that created it. Continuing with the example, then, the application server nodes $N_2$, $N_3$ and $N_4$ update their respective remote map timing information lists, adding the timer information object for timing information $T_{11}$ in association with application server node $N_1$.

In some examples, timer information objects for the timing information of a particular application server node are sent to fewer than all the other application server nodes of the cluster. For example, timer information objects for the timing information of a particular application server node may be sent to one or more other application server nodes. Sending timer information objects to fewer application server nodes minimizes the overhead associated with maintaining replicated timer information objects, although also limiting flexibility should a failover be required.

Figure 4:
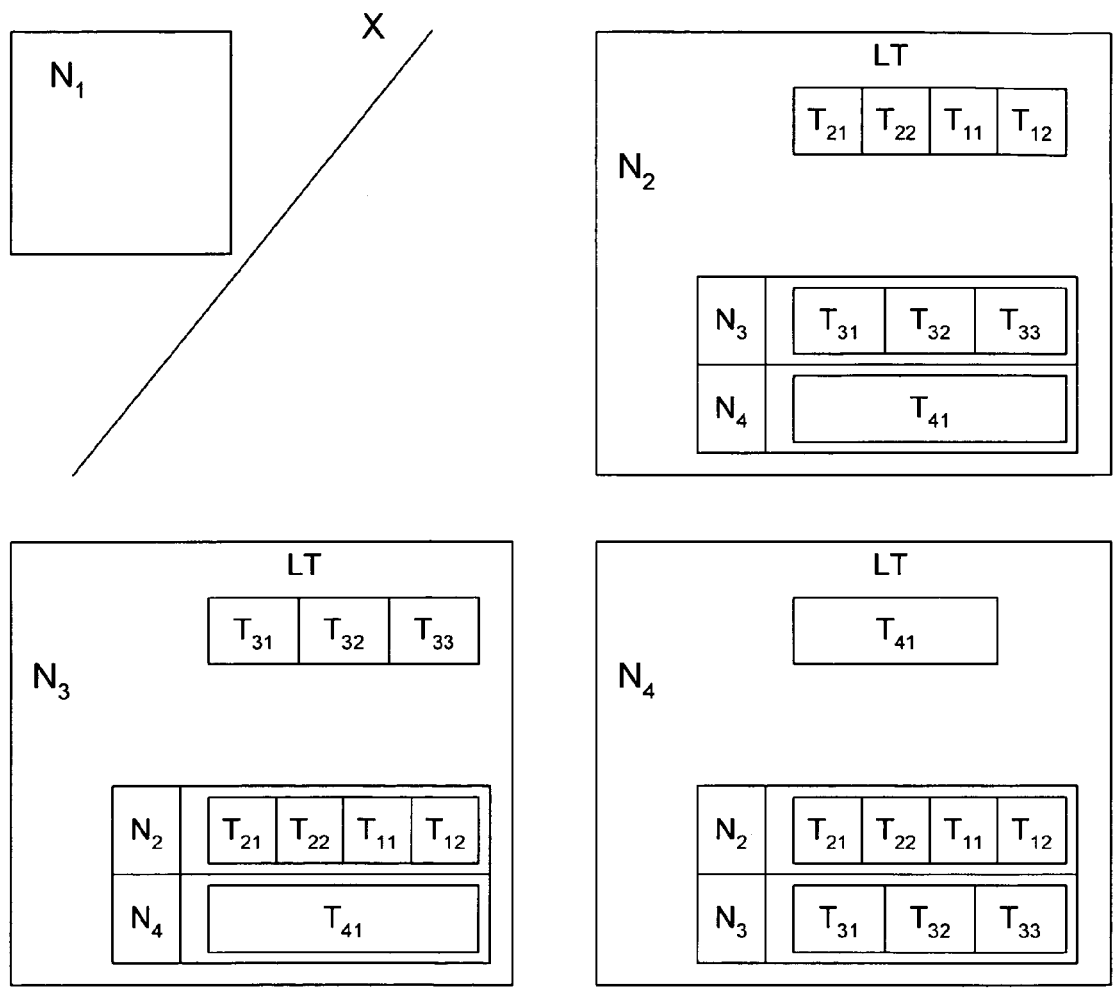
FIG. 4 schematically illustrates the timer configuration of the FIG. 2 cluster of application server nodes, after a failover.

We now turn to FIG. 4, which illustrates the timing information configuration of the FIG. 2 cluster of application server nodes, after a failover of application server node $N_1$ to application server node $N_2$. It can thus be seen in FIG. 4 that the timing information $T_{11}$ and $T_{12}$ in node $N_2$, which were formerly in the remote map timing information list in application server node $N_2$ in association with node $N_1$ (in FIG. 2), are now in the local timing information list of application server node $N_2$ (in FIG. 4). For the application server nodes $N_3$ and $N_4$, the timing information $T_{11}$ and $T_{12}$, which were formerly in the remote map timing information list in application server nodes $N_3$ and $N_4$ in association with application server node $N_1$, are moved to be in the timing information list in association with application server node $N_2$.

Figure 5:
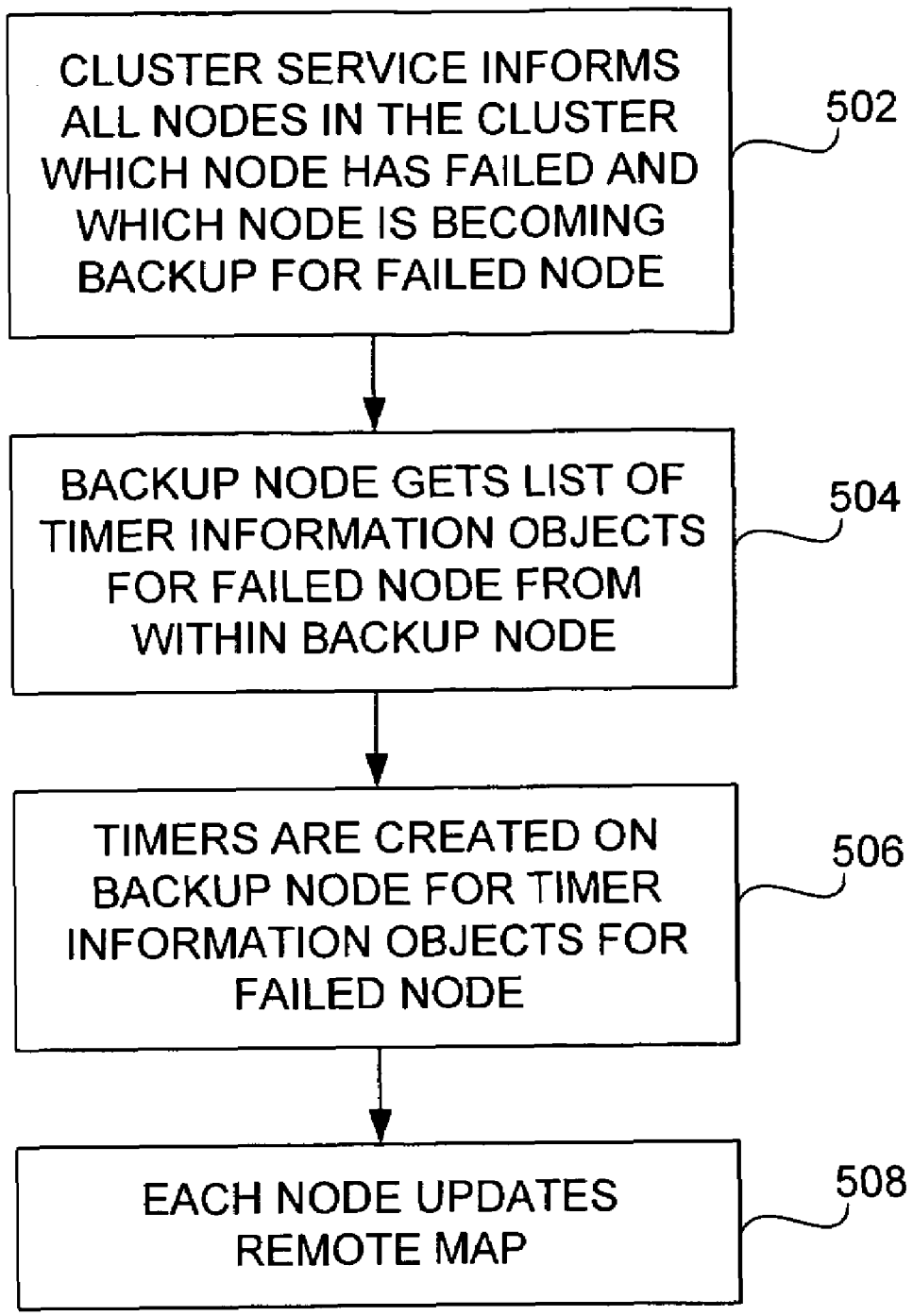
FIG. 5 is a flowchart illustrating steps that are taken in an application server node after a failover of another application server node to that application server node.

FIG. 5 generally illustrates steps that are taken after a failover with respect to a particular application server node. At step 502, the application server nodes of the cluster are informed (e.g., via a "cluster service) of the failed application server node and of the backup application server node for the failed application server node.

At step 504, the backup application server node for the failed application server node gets the list of timer information objects for the failed application server node from the remote map of the backup application server node.

At step 506, the backup application server node also creates local timing information from the timer information objects for the failed application server node. At step 508, each application server node updates its remote map. More particularly, the timer information objects in association with the failed application server node are added to the list of timer information objects in association with the backup application server node.

Thus, for example, a timer in Node 1 ($T_{11}$) may be scheduled to give a callback at intervals of thirty minutes. It is assumed the timer was "ticking" and fifteen minutes have passed when Node 1 fails. The backup timer information object in Node 2 for timer $T_{11}$ will contain the information of the $T_{11}$ timer. After failover, the timer in Node 2 now will give a callback after fifteen minutes (i.e., thirty minus fifteen). As discussed above, generally, the timer information objects are not dummy objects but, rather, they have the expiry and other timing information with them. In addition, an intelligent cluster service can inform Node 2 how long it took (e.g., ten seconds) for failover (in which case the Node 2 timer will give a callback in a time that accounts for the failover (e.g., after 14 minutes and 50 seconds, accounting for the ten seconds for failover).

As another example, it is assumed that the $T_{11}$ timer was giving callback in a transaction when Node 1 fails. This transaction will be rolled back and started again in Node 2. An intelligent load balancer may then quietly give the request to Node 2 in such an event, and the users will experience a delay due to the failover time (e.g., ten seconds, as in the example above) in their requests.

We now briefly more particularly discuss the remote maps. Broadly speaking, as discussed above, the remote maps are maintained in a decentralized manner, in association with each application server node of a cluster rather than using shared resources of the cluster. For example, the remote maps may be stored in non-volatile storage of each application server node, or even in volatile storage (such as volatile memory) of each application server.

Using this approach, business logic objects in a cluster of application server nodes, such as EJB timers, are highly available. In addition, the time to create timing information (particularly using faster access local resources, as opposed to slower access shared resources) is generally lower than using conventional techniques and configurations. Thus, performance is improved even in the absence of failover involving the timing formation. Furthermore, and perhaps more significantly, failover with respect to timing information is faster, since the timing information is more readily available to the backup application server node.

What is claimed is:

1. A system to execute an application, comprising:
a cluster of a plurality of application server nodes, each application server node executing on a computing device and having residing thereon at least one container that contains business logic for the application;
wherein, each of the plurality of application server nodes is configured to maintain self-timing information for use to schedule execution of the business logic contained by the at least one container residing on each of the plurality of application server nodes; and
each of the plurality of application server nodes is configured to maintain backup timing information for the other application server nodes of the cluster, from which the self-timing information maintained by each of the plurality of application server nodes can be derived.

2. The system of claim 1, wherein:
at least one of the application server nodes is configured to be a failover node for the business logic of at least a particular one of the application server nodes; and
the at least one of the application server nodes is configured to process the backup timing information for the at least a particular one of the application server nodes, for use by the at least one of the application server nodes to schedule the business logic formerly handled by the at least a particular one of the application server nodes.

3. The system of claim 2, wherein:
the at least one of the application server nodes is configured to derive, from the backup timing information maintained by the at least one of the application server nodes, the timing information for the particular one or more of the application server nodes; and
the at least one of the application server nodes is configured to be a failover application server node for business logic of the particular one or more of the application server nodes, including using the derived timing information.

4. The system of claim 3, wherein:
the at least one of the application server nodes being configured to be a failover server node includes the at least one of the application server nodes being configured to include the derived timing information as self-timing information for the at least one of the application server nodes.

5. The system of claim 2, wherein:
the at least one of the application server nodes is configured to receive at least one timer information object from the particular one or more of the application server nodes, corresponding to the backup timing information.

6. The system of claim 5, wherein the received at least one timer information object is the backup timing information.

7. The system of claim 1, wherein:
the self-timing information and the backup timing information is maintained in a memory of each of the plurality of application server nodes.

8. The system of claim 1, wherein:
the container is an ENTERPRISE JAVA BEANS container, and the business logic is implemented by one or more ENTERPRISE JAVA BEANS.

9. A method of operating a cluster of a plurality of application server nodes, to execute an application, each of the plurality of application server nodes having residing thereon at least one container that contains at least a portion of business logic for the application comprising:
by each of the plurality of application server nodes, creating self-timing information for use to schedule execution of the business logic contained by the at least one container residing on each of the plurality of application server nodes;
by each of the plurality of application server node, providing at least one timer information object, from which the self-timing information can be derived, to each of the other application server nodes of the plurality of application servers.

10. The method of claim 9, further comprising:
by a particular one application server node, receiving at least one timer information object, from which self-timing information for another of the plurality of application server nodes can be derived.

11. The method of claim 10, further comprising:
by the particular one application server node, deriving the self-timing information for each of the other application server nodes of the plurality of application server nodes from the received at least one timer information object.

12. The method of claim 11, further comprising:
treating the derived self-timing information for each of the other application server nodes of the plurality of application server nodes as self-timing information for the particular one application server node, including executing business logic formerly executed each of the other application server nodes of the plurality of application server nodes, based at least in part on the derived self-timing information.

13. The method of claim 10, further comprising:
saving the received timer information objects in a memory of the particular one application server node.

14. The method of claim 9, wherein:
the container is an ENTERPRISE JAVA BEANS container, and the business logic is implemented by one or more ENTERPRISE JAVA BEANS.

* * * * *